Patented Oct. 16, 1951

2,571,238

UNITED STATES PATENT OFFICE 2,571,238

BIOTIN INTERMEDIATE

Stanton A. Harris, Westfield, Ralph Mozingo, Elizabeth, Glen E. Arth, Rahway, and Karl Folkers, Plainfield, N. J., assignors to Merck & Co., Inc., Rahway, N. J., a corporation of New Jersey No Drawing. Application December 15, 1945, Serial No. 635,424

12 Claims. (Cl. 260—332.2)

This invention is concerned generally with novel chemical compounds and processes for preparing the same; more particularly it relates to novel compounds useful as intermediates in the synthesis of tetradehydrobiotin. Tetradehydrobiotin is the chemical compound 2-(4'-carboxy-butyl)-3:4-ureido-thiophene having the empirical formula $C_{10}H_{12}O_3N_2S$ and the structural formula:

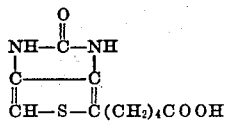

It is now found that this compound can be synthesized by reactions indicated as follows:

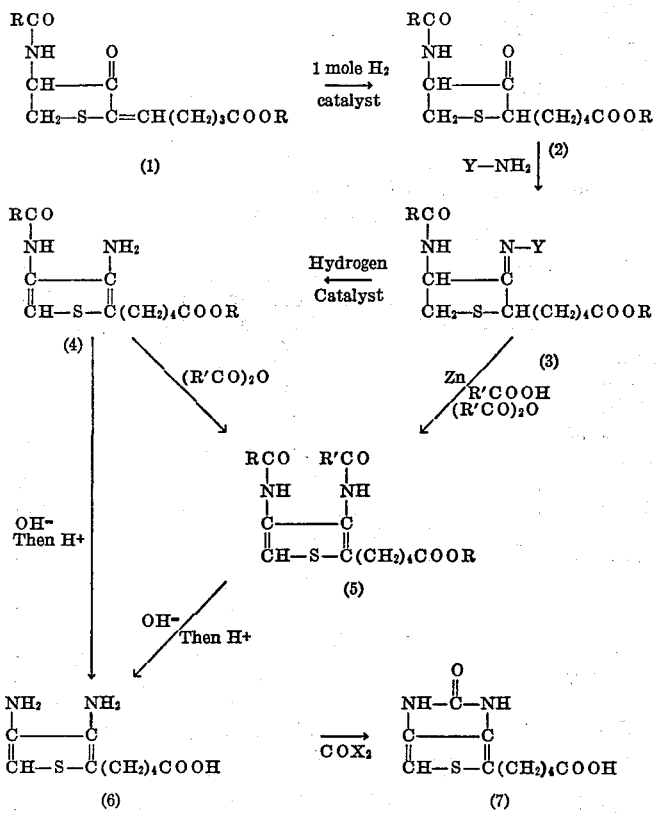

In the above formulae, R represents an alkyl, aryl or aralkyl group, X a halogen, and $YNH_2$ a compound selected from the group consisting of hydroxylamine, arylhydrazines and semicarbazide.

The reactions indicated above are conducted as follows: 2-(4'-carboxy-butylidene)-3-keto-4-acylamido-tetrahydrothiophene ester (1) is reacted with one molecular equivalent of hydrogen in the presence of a hydrogenation catalyst to produce the corresponding ester of 2-(4'-carboxy-butyl)-3-keto-4-acylamido-tetrahydrothiophene (2). This compound is then reacted with a member of the group which consists of hydroxylamine, arylhydrazines and semicarbazide to produce the corresponding 3-keto substitution product (3); in the case of hydroxylamine, this product is an ester of 2-(4'-carboxy-butyl)-3-oximino-4-acylamido-tetrahydrothiophene. This product is reacted in the presence of a hydrogenation catalyst and preferably in the presence of hydrogen whereupon a simultaneous hydrogenation and dehydrogenation occurs forming the 2-(4'-carboxy-butyl)-3-amino-4-acylamido-thiophene ester (4); alternatively the 3-keto substitution product can be treated with zinc in the presence of a mixture of an aliphatic organic acid and its anhydride, whereby the 2-(4'-carboxy-butyl)-3:4-diacylamido-thiophene ester (5) results; when these acylamido derivatives are treated with an aqueous alkaline solution, hydrolysis of the acyl groups occurs, yielding 2-(4'-carboxy-butyl)-3:4-diamino-thiophene (6) which, when reacted with a carbonyl halide produces the compound 2-(4'-carboxy-butyl)-3:4-ureido-thiophene (7).

The starting material, the 2-(4'-carboxy-butylidene) - 3 - keto-4-acylamido-tetrahydrothiophene ester can be obtained as indicated in general terms in J. A. C. S., 66, 1756-7 (1944) and as described in detail in co-pending applications, Serial Nos. 554,458; 554,449; 554,450; 554,451 and 554,452, all filed September 16, 1944, now Patents 2,466,232; 2,537,892; 2,537,893; 2,508,457, and 2,452,653, respectively. Inasmuch as the process according to this invention is applicable to compounds of the general class represented by Formula 1 above, it will be apparent that equivalent compounds within this general class can be substituted for the specific compounds mentioned in the following examples. Among these equivalent starting materials are: 2-(4'-carbomethoxy-butylidene) - 3 - keto-4-benzamido-tetrahydrothiophene; 2-(4'-carboethoxy-butylidene)-3-keto-4-benzamido - tetrahydrothiophene; 2 - (4'-carbobenzoxy - butylidene)-3-keto-4-benzamido-tetrahydrothiophene; 2 - (4' - carbopropoxy - butylidene)-3-keto-4-acetamido-tetrahydrothiophene; 2-(4'-carbophenoxy-butylidene)-3-keto-4-propamido-tetrahydrothiophene.

When these compounds are reacted with 1 molecular equivalent of hydrogen in the presence of a hydrogenation catalyst, the product obtained is the corresponding ester of 2-(4'-carboxybutyl)-3 - keto-4-acylamido-tetrahydrothiophene. This product can be reacted with hydroxylamine or a salt thereof; an arylhydrazine such as p-nitrophenyl hydrazine, 2,4-dinitrophenyl-hydrazine and the like; or semicarbazide to produce a compound of the formula:

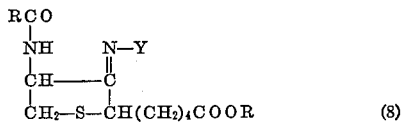
(8)

wherein R represents an alkyl, aryl or aralkyl group and Y—N= is a radical of the class which consists of oximino, arylhydrazino and semicarbazido. This reaction can be carried out in aqueous solution, or if desired, in an aqueous or non-aqueous organic solvent, as for example, a lower aliphatic alcohol.

When this 3-keto- substitution product is allowed to react in the presence of hydrogen and a hydrogenation catalyst, a simultaneous hydrogenation and dehydrogenation takes place, whereby the 3-substituent is reduced to an amino group and at the same time the tetrahydrothiophene ring is dehydrogenated to a thiophene ring, to produce the 2-(4'-carboxy-butyl)-3-amino-4-acylamido-thiophene ester. It is presently preferred, where practicing the process according to this invention, to use a noble metal hydrogenation catalyst, particularly platinum or palladium. It is preferred that the catalyst be distributed upon a suitable carrier such as charcoal, diatomaceous silica, barium sulfate and the like, suspended in a reaction medium. The reaction is best conducted in a liquid medium which is preferably a hydroxylated solvent, as for example, water or an organic solvent such as methanol, ethonal and the like.

The hydrogenation-dehydrogenation operation can also be conducted by allowing the 3-keto substitution product of the 2-(4'-carboxy-butyl)-3-keto-4-acylamido-tetrahydrothiophene ester to react with zinc in the presence of a mixture of an organic acid and its anhydride, whereby the group in the 3-position is simultaneously reduced and acylated to produce a 3-acylamido substituent and the tetrahydrothiophene ring is dehydrogenated to thiophene. Acids and anhydrides which can be employed in this reaction include acetic acid and its anhydride, propanoic acid and its anhydride and the like; it is presently preferred to employ the metal in the form of a finely divided powder.

When compounds of the formula:

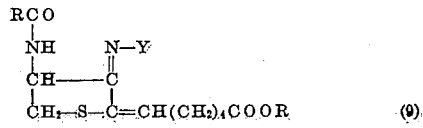
(9)

wherein R represents an alkyl, aryl or aralkyl group and Y—N= is a radical of the class which consists of oximino, arylhydrazino and semicarbazido, are reacted with a reducing agent according to the processes described in co-pending applications Serial No. 635,426, filed December 15, 1945, and Serial No. 635,427, filed December 15, 1945, now Patents 2,487,051 and 2,460,225, respectively, the chief products obtained may be represented by the general formulae:

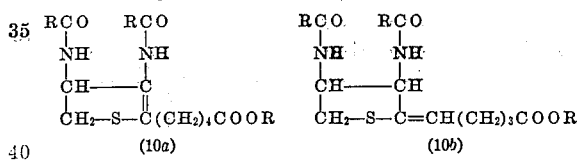
(10a) (10b)

and

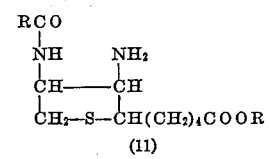
(11)

wherein R has the significance above-defined. In addition to these compounds, however, by-products are obtained having the formula:

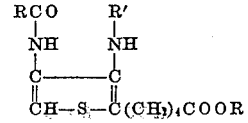

wherein R' is an acyl group or hydrogen and R has the significance above-defined. These by-products are produced by dehydrogenation of the tetrahydrothiophene ring which occurs simultaneously with the hydrogenation reaction. Under certain conditions, the dehydrogenation reaction described above predominates, as for example: when 2-(4'-carbomethoxy-butylidene)-3-(p-nitrophenyl-hydrazino) - 4 - benzamido-tetrahydrothiophene is heated with zinc and a mixture comprising acetic acid and acetic anhydride, or when said compound is reacted with hydrogen at room temperature in the presence of acetic anhydride and Willstätter palladium, the main product is 2-(4'-carbomethoxy-butyl)-3-acetamido-4-benzamido-thiophene.

The acylamido compounds obtained by these dehydrogenation reactions, namely the esters of 2-(4'-carboxy-butyl)-3-amino-4-acylamido-thiophene and 2-(4'-carboxy-butyl)-3:4-diacylamido-thiophene can be hydrolyzed by heating with an aqueous solution of an alkali metal or an alkaline earth metal hydroxide; it is presently preferred to use aqueous barium hydroxide solution, to produce 2-(4'-carboxy-butyl)-3:4-diaminothiophene. This compound can then be reacted with a carbonyl halide such as phosgene preferably at a temperature of the order of 0° C., and in an aqueous alkaline solution, containing an alkali metal hydroxide or an alkali metal salt of a weak acid such as sodium carbonate or the like to produce the desired 2-(4'-carboxy-butyl)-3:4-ureido-thiophene.

The following examples illustrate methods of carrying out the present invention but it is to be understood that these examples are given by way of illustration and not of limitation.

*Example 1*

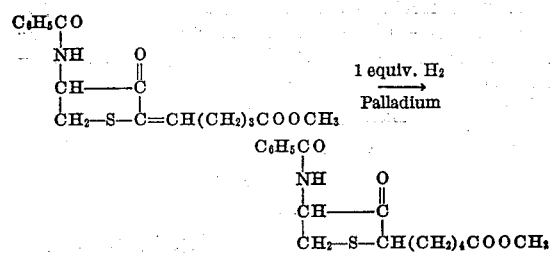

About 1.7 gms. of 2-(4'-carbomethoxy-butylidene)-3-keto-4-benzamido-tetrahydrothiophene which can be prepared as described in co-pending application, Ser. No. 554,452, filed September 16, 1944, is dissolved in about 200 cc. of methanol in which is suspended the palladium-charcoal catalyst obtained by previously reducing about 10 gms. of charcoal-palladium-chloride mixture containing 5% by weight of palladium-chloride. This mixture is then shaken with hydrogen at 40 pounds per square inch pressure until one mole equivalent has been absorbed. This takes approximately 4 hours. The slurry is then filtered and the catalyst washed thoroughly with methanol; the methanol solution is evaporated and the concentrated solution cooled and the crystals which form are filtered and dried to produce substantially pure 2-(4'-carbomethoxy-butyl)-3-keto-4-benzamido-tetrahydrothiophene; M. P. 114–116° C.

*Example 2*

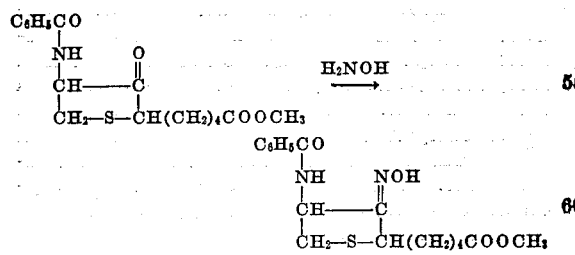

A solution containing about 0.21 gm. of 2-(4'-carbomethoxy-butyl)-3-keto-4-benzamido-tetrahydrothiophene (prepared in accordance with the directions given in Example 1) is dissolved in about 5 cc. absolute alcohol and the solution is treated with an excess of hydroxylamine hydrochloride and sodium acetate and the mixture is heated on a steam bath for about ½–1 hour. The reaction mixture is diluted with water and cooled, whereupon feathery crystals of one of the stereoisomeric racemates of 2-(4'-carbomethoxybutyl)-3-oximino-4-benzamido-tetrahydrothiophene separates and is recovered by filtration and dried; M. P. 160–161° C. This oximino ester can be converted to the free acid by boiling with an aqueous methanol solution of sodium methoxide, which, upon acidification, yields a substantially pure form of the corresponding stereoisomer of 2-(4'-carboxy-butyl)-3-oximino-4-benzamido-tetrahydrothiophene; M. P. 201° C.

A second stereoisomeric oxime is prepared as follows: the methanol solution obtained in Example 1 after filtration of the stereoisomeric racemate of 2-(4'-carbomethoxy-butyl)-3-keto-4-benzamido-tetrahydrothiophene (M. P. 114°–116° C.) is treated with an excess of hydroxylamine hydrochloride and sodium acetate and the mixture heated on a steam bath for about ½ hour. The reaction mixture is diluted with water and the crude product which separates is fractionally crystallized from ethyl acetate to produce a second stereoisomeric racemate of the oxime prepared above, which has a different crystal structure. This material is purified by recrystallization from methanol-water solution to produce a second stereoisomeric racemate of 2-(4'-carbomethoxy-butyl)-3-oximino-4-benzamido-tetrahydrothiophene; M. P. 152–154° C.

*Example 3*

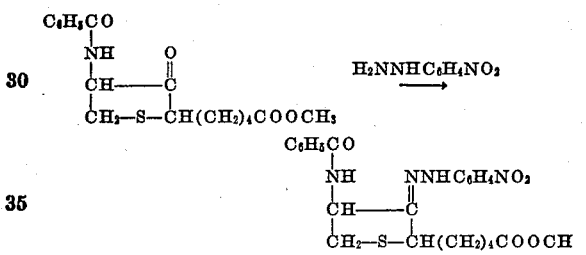

About 1.4 gms. of 2-(4'-carbomethoxy-butyl)-3-keto-4-benzamido-tetrahydrothiophene is dissolved in about 50 cc. of methanol containing one drop of concentrated hydrochloric acid and the resulting solution is heated under reflux with one molecular equivalent of p-nitrophenyl-hydrazine for approximately ½ hour. The reaction mixture is cooled and allowed to stand for approximately two days, whereupon the p-nitrophenol-hydrazone of the starting material crystallizes and is recovered by filtration and dried; M. P. 143–145° C.

*Example 4*

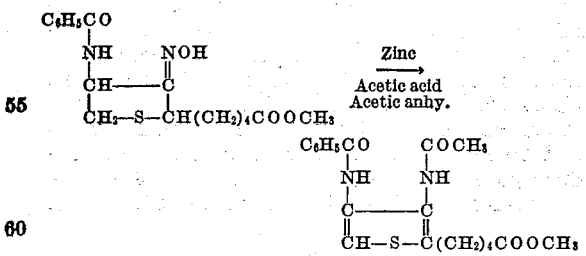

About 1.8 grams of 2-(4'-carbomethoxy-butyl)-3-oximino-4-benzamido-tetraphydrothiophene is dissolved in a mixture of about 50 cc. acetic anhydride and 100 cc. glacial acetic acid. Approximately 6.5 gms. zinc dust is then added with vigorous stirring at the same time maintaining the temperature at approximately 0° C. The stirring is continued for an additional 15 hours, during which time the temperature is allowed to rise gradually to room temperature. The unreacted zinc dust is removed by filtration and the solution evaporated to dryness. Water is added to the residual product and the mixture heated to decompose the remaining traces of acetic anhydride. The aqueous suspension is extracted with chloroform, the chloroform extract washed with water, dried, and the chloroform distilled to produce approximately 1.6 grams of crude material. This product is then purified by extraction with ether followed by crystallization to produce substantially pure 2-(4'-carbomethoxy - butyl) - 3 - acetamido - 4 - benzamidothiophene; M. P. 152° C.; further recrystallization from methanol produces material melting at 160° C.

*Example 5*

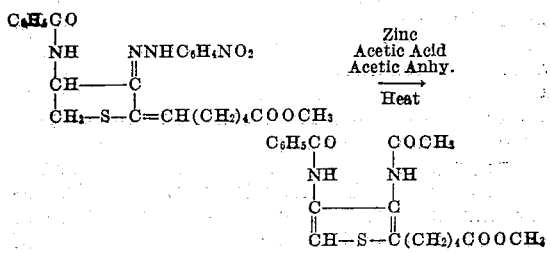

About 1.2 gms. of 2-(4'-carbomethoxy-butylidene) - 3 - (p - nitrophenyl - hydrazino) - 4-benzamido-tetrahydrothiophene is dissolved in a mixture of about 25 cc. of acetic acid and 25 cc. acetic anhydride. This solution is then heated on a steam bath with an excess of zinc dust for approximately 2 hours, at which time the yellow color of the solution disappears. The solution is then filtered to remove unreacted zinc dust and evaporated to dryness under reduced pressure, and the residue dissolved in a mixture of chloroform and water. The chloroform-water solutions are filtered from a white insoluble product (which is the diacetate of phenylene diamine), the chloroform layer is evaporated to dryness and the residue extracted with ether. Upon evaporation of the ether extract, 0.7 gm. of crystalline material is obtained which is purified by recrystallization from methanol to produce pure 2 - (4' - carboxy - butyl) - 3 - acetamido-4-benzamido-thiophene; M. P. 159–160° C.

*Example 6*

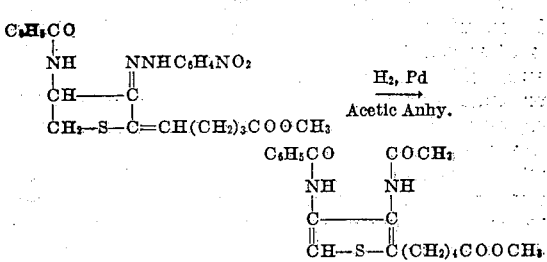

About 0.9 gm. of 2-(4'-carbomethoxy-butylidene) - 3 - (p - nitrophenylhydrazino) - 4-benzamido-tetrahydrothiophene (prepared as described in co-pending application Serial No. 635,427, filed December 15, 1945, now Patent No. 2,460,225) is dissolved in about 125 cc. of acetic anhydride containing 2 cc. concentrated hydrochloric acid. 0.5 gm. of Willstätter palladium (prepared as described in Ber. 54, 123 (1921)) is added and the mixture is shaken for 4 days. The acid is neutralized with sodium acetate, and solvent is distilled off under a reduced pressure and at low temperature. The residual product is suspended in water and the organic material extracted therefrom by means of chloroform. The chloroform layer is then evaporated to produce a dark-brown viscous oil which is extracted with ether and the ether extract evaporated to produce a bright-yellow oil which partially crystallizes upon standing. The crystalline material is purified by recrystallization from methanol to produce nearly white crystals of 2 - (4' - carbomethoxy - butyl) - 3-acetamido-4-benzamido-thiophene; M. P. 159°–160° C.

*Example 7*

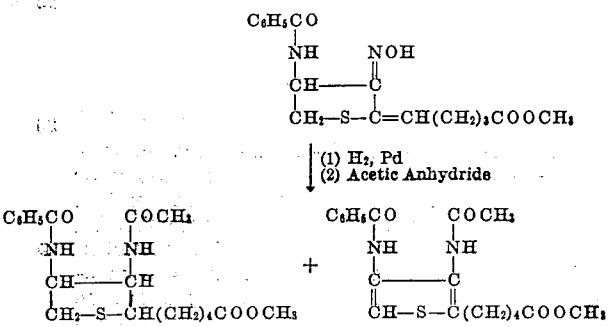

About one gram of the mixed oximes of 2-(4'-carbomethoxybutylidene) - 3-keto-4-benzamido-tetrahydrothiophene is dissolved in about 189 ml. of methanol containing about 11 ml. of 3.3% hydrochloric acid. About 15 g. of 5% palladium on barium sulfate catalyst is added to this solution and the mixture shaken under three atmospheres of hydrogen for approximately 40 minutes, at which time about 12 gms. additional catalyst is added. The mixture is shaken under hydrogen pressure for approximately 18 hours additional time and the catalyst is removed by centrifugation. Water and enough sodium acetate is added to neutralize the acid, and the solution is extracted with chloroform. The chloroform extract is evaporated to dryness and the residue is acetylated by heating with acetic anhydride on the steam bath. After evaporation of the excess acetic anhydride, the residue is dissolved in chloroform and washed with aqueous sodium bicarbonate. The chloroform extract is evaporated to dryness to produce approximately 0.8 gm. crude material.

A sample of this crude material is hydrolyzed by heating with aqueous barium hydroxide solution and then reacted with phosgene. Microbiological assay of this product shows 25% biotin corresponding to approximately 25% of 2-(4'-carboxy-butyl) - 3 - acetamido - 4 - benzamido-tetrahydrothiophene originally present.

The remainder of the residue crystallizes on standing. This is separated chromatographically using 20 g. of activated charcoal from acetone solution and the adsorbed material eluted with chloroform. The chloroform extract is evaporated to dryness and the residue is recrystallized from a methanol-ether solution to yield about 0.17 g. of 2-(4'-carbomethoxy-butyl)-3-acetamido-4-benzamido-thiophene; M. P. 156–160° C.

This case is a continuation-in-part of application Serial No. 554,455, filed September 16, 1944, now Patent No. 2,487,050, by the same inventors, entitled Chemical Compounds and Processes of Preparing the Same.

Modifications may be made in carrying out the present invention without departing from the spirit and scope thereof and the invention is to be limited only by the appended claims.

We claim:

1. The process which comprises reacting 2-(4'-carbomethoxy-butyl)-3-oximino-4-benzamido-tetrahydrothiophene with hydrogen in the presence of a noble metal hydrogenation catalyst to produce 2-(4'-carbomethoxy-butyl)-3-amino-4-benzamido-thiophene.

2. The process which comprises reacting 2-(4'-carbomethoxy-butyl)-3-oximino-4-benzamido-tetrahydrothiophene with hydrogen in the presence of palladium to produce 2-(4'-carbomethoxy-butyl)-3-amino-4-benzamido-thiophene.

3. The process which comprises reacting 2-(4'-carbomethoxy-butyl)-3-(p-nitrophenylhydrazino)-4-benzamido-tetrahydrothiophene with hydrogen in the presence of palladium to produce 2-(4'-carbomethoxy-butyl)-3-amino-4-benzamido-thiophene.

4. The process which comprises reacting 2-(4'-carbomethoxy-butyl)-3-oximino-4-benzamido-tetrahydrothiophene with zinc in the presence of a mixture which comprises acetic acid and its anhydride to produce 2-(4'-carbomethoxy-butyl)-3-acetamido-4-benzamido-thiophene.

5. 2-(4'-carbomethoxy-butyl)-3-acetamido-4-benzamido-thiophene.

6. 2-(4'-carbomethoxy-butyl)-3-amino-4-benzamido-thiophene.

7. The process of preparing 3-amino-4-acylamido-2-(4'-carboxy-butyl)-thiophene esters which comprises reacting 2-substituted tetrahydrothiophenes having the formula:

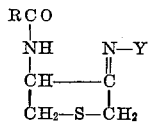

wherein R is a radical selected from the group which consists of alkyl, aryl and aralkyl radicals, Y—N= is a radical selected from the group which consists of oximino, arylhydrazino and semicarbazido radicals, and having a 2-position substituent selected from the class which consists of 4'-carboalkoxy-butyl, 4'-carboaroxy-butyl, 4'-carboaralkoxy-butyl, 4'-carboalkoxy-butylidene, 4'-carboaroxy-butylidene and 4'-carboaralkoxy-butylidene radicals, with hydrogen in the presence of a noble metal hydrogenation catalyst.

8. The process of preparing 3-amino-4-acylamino-2-(4'-carboxy-butyl)-thiophene esters which comprises reacting 2-substituted tetrahydrothiophenes having the formula:

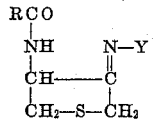

wherein R is a radical selected from the group which consists of alkyl, aryl and aralkyl radicals, Y—N= is a radical selected from the group which consists of oximino, arylhydrazino and semicarbazido radicals, and having a 2-position substituent selected from the class which consists of 4'-carboalkoxy-butyl, 4'-carboaroxy-butyl, 4'-carboaralkoxy-butyl, 4'-carboalkoxy-butylidene, 4'-carboaroxy-butylidene and 4'-carboaralkoxy-butylidene radicals, with hydrogen in the presence of a palladium catalyst.

9. The process of preparing 3:4-diacylamido-2-(4'-carboxy-butyl)-thiophene esters which comprises reacting 2-substituted tetrahydrothiophenes having the formula:

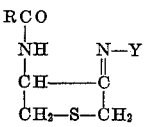

wherein R is a radical selected from the group which consists of alkyl, aryl and aralkyl radicals, Y—N= is a radical selected from the group which consists of oximino, arylhydrazino and semicarbazido radicals, and having a 2-position substituent selected from the class which consists of 4'-carboalkoxy-butyl, 4'-carboaroxy-butyl, 4'-carboaralkoxy-butyl, 4'-carboalkoxy-butylidene, 4'-carboaroxy-butylidene and 4'-carboaralkoxy-butylidene radicals, with zinc, an aliphatic acid and an aliphatic acid anhydride.

10. 2-(4'-carboalkoxy-butyl)-3:4-diacylamido-thiophene.

11. 2-(4'-carboalkoxy-butyl)-3-amino-4-acylamido-thiophene.

12. N-acylated-2-(4'-carboalkoxy-butyl)-3:4-diamino-thiophene.

STANTON A. HARRIS.
RALPH MOZINGO.
GLEN E. ARTH.
KARL FOLKERS.

REFERENCES CITED

The following references are of record in the file of this patent:

UNITED STATES PATENTS

| Number | Name | Date |
|---|---|---|
| 2,373,136 | Hoover | Apr. 10, 1945 |
| 2,399,974 | Avison | May 7, 1946 |

OTHER REFERENCES

Karrer, "Organic Chemistry," p. 428, Nordeman Publ., N. Y., 1938.

Karrer, Helv. Chim. Acta., 27, 143 (1944).